Sept. 16, 1924.
F. C. THORNLEY ET AL
MANUFACTURE OF CELLULOSE
Filed Dec. 10, 1923
1,509,034
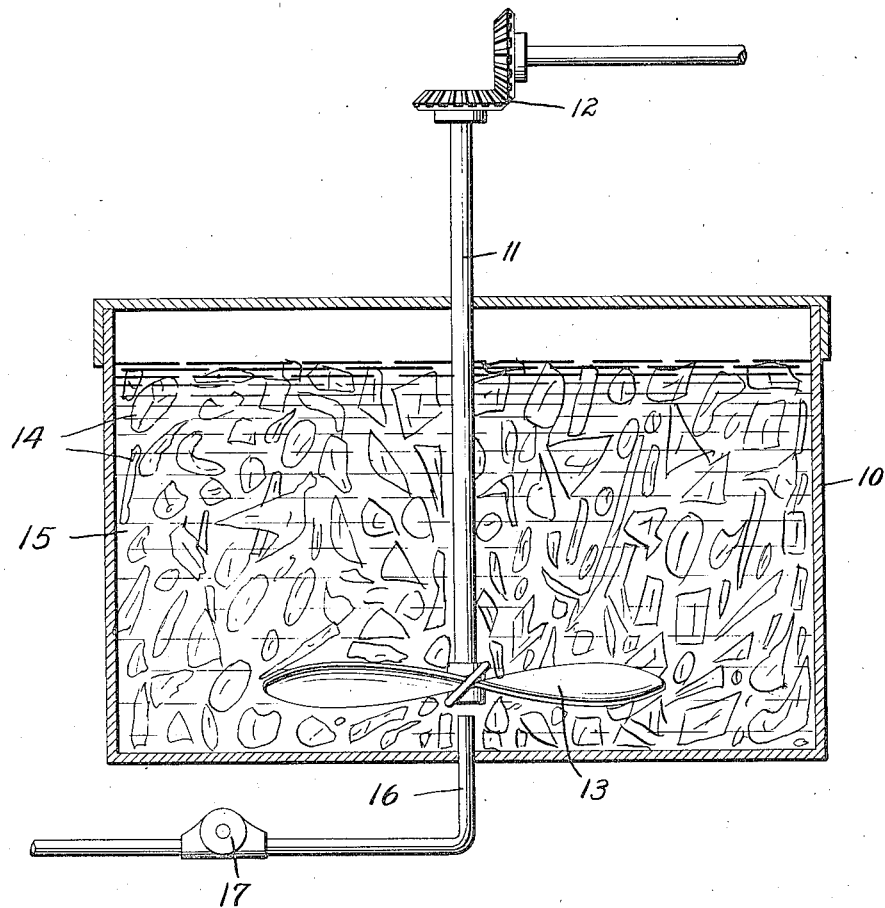
Inventors
Fred C. Thornley
Frank Ford Tapping
Otto Reynard
By
Pennie, Davis, Marvin & Edmonds
Attorney Patented Sept. 16, 1924.

1,509,034

UNITED STATES PATENT OFFICE.

FRED CURTIS THORNLEY AND FRANK FORD TAPPING, OF KNIGHTSBRIDGE, LONDON, AND OTTO REYNARD, OF INKERMAN TERRACE, LONDON, ENGLAND; SAID TAPPING AND SAID REYNARD ASSIGNORS TO SAID THORNLEY.

MANUFACTURE OF CELLULOSE.

Application filed December 10, 1923. Serial No. 679,755.

*To all whom it may concern:*

Be it known that we, FRED CURTIS THORNLEY, FRANK FORD TAPPING, and OTTO REYNARD, all subjects of the King of Great Britain, and residing, respectively, at Hyde Park Hotel, Knightsbridge, in the county of London, England; Hyde Park Hotel, Knightsbridge, in the county of London, England; and 8 Inkerman Terrace, in the county of London, England, have invented certain new and useful Improvements in or Relating to the Manufacture of Cellulose, for which I have filed application in Great Britain, #23421, dated Aug. 29, 1922, and of which the following is a specification.

This invention relates to the manufacture of cellulose from finely divided woody matter of all kinds, such as sawdust, wood waste, green or untreated pulp produced by grinding timber, and other substances of vegetable origin, such as rushes, seaweed or bamboo, by subjection to the action of sulphur dioxide gas in a liquid medium.

According to this invention we use the sulphur dioxide gas in an extremely fine state of sub-division produced mechanically by intense agitation. Owing to the fine state of sub-division thus produced in the gas immediately on its introduction to the vessel in which the materials are treated and before being brought into contact with the said materials, the gas is rendered more chemically active, being immediately adsorbed by the material treated, this resulting in the treatment being accomplished more rapidly and thoroughly. The said woody or vegetable substances are themselves subjected to intense agitation in a liquid medium simultaneously with such exposure to the action of the finely divided sulphur dioxide gas, and can thus be converted into a solid product consisting mainly of cellulose and a liquid product containing the non-cellulose constituents of the original raw material in solution or in apparent solution together with only a small proportion of extraneous mineral matter. The liquid product, in which sulphur dioxide remains dissolved, can be again used with the addition of a relatively small quantity of fresh liquid, and by heat and pressure in the next repetition of the process such residuary sulphur dioxide is again set free in fine sub-division to continue its action, in conjunction with a further supply of sulphur dioxide gas mechanically sub-divided on admission to the vessel in which a further quantity of solid raw material is treated.

The raw material treated may be roughly described as a complex of cellulose, ligno-cellulose, resins, and vegetable gums. The well-known process of heating such a complex with a strong solution of a bisulphite under pressure results in the slow but progressive decomposition of the ligno-cellulose by the sulphur dioxide evolved, with the final separation of the raw material into solid cellulose on the one hand, and a colloidal solution of metallic sulphite, sulpho-lignin bodies and resins on the other. In the process according to the present invention, it is considered that the gas being very finely sub-divided is at once adsorbed by the raw material (probably more particularly by the cellulose content of the raw material) and thus brought into intimate and highly reactive contact with the ligno-cellulose and the gummy constituents, this resulting in a very rapid breaking down of the complex instead of a slow progressive decomposition. The resins and gums, which almost immediately pass into colloidal solution, produce minute bubbles, which lower the surface tension at the interfaces between the solid raw material and the liquid medium, and this lowering of the surface tension establishes conditions which are still more favourable to the adsorption of the gas by the said material. In practice, however, it has been found that by the use of this invention highly resinous wood saw-dust could be converted into nearly pure cellulose in two hours, whereas by the existing sulphite methods a much longer treatment with much higher temperatures and pressures would have been required.

An illustrative embodiment of the invention is diagrammatically shown in the accompanying drawing.

We may for example employ a gas-tight vat or pan 10 in which a vertical shaft 11 is rotated with extreme rapidity by suitable gearing 12 located above the vat, this shaft carrying one or more screw-propeller shaped or other suitable agitators 13. The vat contains the finely divided woody or vegetable substances 14 in a liquid medium 15 such as water, lime-water or milk of lime, convenient proportions being for example about 4 tons of liquid medium to 1 ton of raw vegetable substance, but more or less than this may be used according to the physical character of the solid matter undergoing treatment. The liquid medium may however consist of a solution of sodium carbonate or other water-soluble alkaline material, or may carry in suspension the oxide, hydroxide or carbonate of an alkaline earth or heavy metal, the dissolved or suspended matter in all cases acting as a carrier or catalyst of the sulphur dioxide, which is by this means and by the agitation kept in a fine state of division and in intimate contact with the particles of woody substance. For example convenient proportions of the various above mentioned basic substances would be 8 to 16 pounds of sodium hydroxide, or 11 to 21 pounds of sodium carbonate, or 11 to 25 pounds of calcium oxide, or 20 to 40 pounds of calcium carbonate, or 8 to 16 pounds of magnesium oxide, or 17 to 34 pounds of magnesium carbonate, per 100 gallons of liquid in each case. The sulphur dioxide may be introduced through a pipe 16 adjacent to the foot of the vertical shaft 11, in which position the entrance of the gas is encouraged by the suction produced by the lowest agitator, and it may be supplied at a pressure greater than atmospheric pressure. The increased pressure may be produced by any suitable means as, for example, the blower 17. The temperature in the vat may vary according to requirements from atmospheric temperature to 100 degrees centigrade or more, the extraneous heat if required being supplied in any suitable manner. Conveniently about 100 to 200 pounds of sulphur dioxide per ton of vegetable matter treated may be injected into the reaction vessel according to the temperature and pressure at which the operation is carried out. Of the gas so injected from 70 to 90 pounds is absorbed and utilized by each ton of the vegetable material, the rest being recoverable and available for further use. The process may continue for from 2 to 12 hours, the time depending upon the nature of the raw material, and upon the temperature, pressure and degree of sub-division attained on the introduction of the active gas employed. The excess liquid can then be drained off from the solid or semi-solid product and any liquid remaining mixed with the said product can be separated therefrom in any usual manner, as for example by centrifugal action. The solid product can then be used for paper manufacture or any of the ordinary uses of cellulose. The liquid thus drained off and separated may be used several times, with the addition each time of a small quantity of fresh liquid, for the treatment of successive batches of the woody substance, until it becomes too highly charged with the resinous or other soluble constituents of the wood to be of further service for this purpose. Three or other number of vats may be connected together by pipes and used in succession for carrying out the process. The concentrated liquid can afterwards be freed from excess of sulphur dioxide by known means, when it becomes directly applicable as a size or binding medium, or may be subjected to destructive processes to recover any of its constituents which may be separately valuable.

A particular advantage obtained by the use of this invention is that the liquid by-product, instead of being of large volume and of a troublesome nature, is relatively small in quantity owing to its repeated use as above described and is itself capable of industrial utilization without difficulty.

What we claim and desire to secure by Letters Patent of the United States is:—

1. A process for the manufacture of cellulose from finely divided vegetable substances such as woody matter, which comprises introducing sulfur dioxide into a liquid medium in which the vegetable substances are suspended and subjecting the entering gas and liquid medium to intense mechanical agitation whereby an intimate mixture of the gas and liquid medium is produced.

2. A process for the manufacture of cellulose from finely divided vegetable substances, such as woody matter, which comprises introducing sulfur dioxide into a liquid medium in which the substances are suspended and subjecting the entering gas and liquid medium to the action of high speed rotating agitating blades whereby an intimate mixture of the gas and liquid medium is produced.

3. A process as in claim 1 in which the gas is supplied at greater than atmospheric pressure.

4. A process as in claim 2 in which the gas is supplied at greater than atmospheric pressure.

FRED CURTIS THORNLEY.
FRANK FORD TAPPING.
OTTO REYNARD.